United States Patent

[11] 3,625,455

[72] Inventor John H. Streets
Redwood City, Calif.
[21] Appl. No. 877,932
[22] Filed Nov. 19, 1969
[45] Patented Dec. 7, 1971
[73] Assignee Ampex Corporation
Redwood City, Calif.

[54] TAPE CASSETTE
8 Claims, 3 Drawing Figs.

[52] U.S. Cl. .......... 242/199, 274/11 C
[51] Int. Cl. .......... G03b 1/04, G11b 15/32, G11b 23/04
[50] Field of Search .......... 242/197–200; 352/72–78; 179/100.2 Z; 274/4 C, 11 C

[56] References Cited
UNITED STATES PATENTS

| | | | |
|---|---|---|---|
| 3,004,729 | 10/1961 | Barkhoff .......... | 242/200 |
| 3,282,523 | 11/1966 | Murdoch .......... | 242/200 X |

*Primary Examiner*—Leonard D. Christian
*Attorney*—Robert G. Clay

ABSTRACT: A tape cassette is provided with a precision baseplate for engaging the cassette-holding surfaces of a transport, a pair of precision ball bearing assemblies mounted solidly on the baseplate, and a pair of tape pack hubs mounted on the bearings and adapted to loosely engage the driving spindles of the transport, so that misalignment of the transport spindles can be tolerated while maintaining the tape packs precisely spaced from the walls of the cassette to avoid rubbing flutter and the abrasion production of oxide dust. The tape is guided with substantial lateral tolerance near the transducing and metering elements of the transport, but is precisely edge-guided near the tape packs. The guides are placed to increase the run of tape available for access.

INVENTOR.
JOHN H. STREETS

BY Robert G. Clay
ATTORNEY

TAPE CASSETTE

BACKGROUND OF THE INVENTION

This invention relates to tape cassettes, and particularly to such cassettes embodying a pair of tape pack hubs adapted for fitting on the driving spindles of a transport.

Previously, tape cassettes, particularly in the audio field, have been arranged with tape pack hubs loosely journaled between the top and bottom flat walls of the cassette, but snugly and precisely fitting on the driving spindles of the transport for accurate alignment in the recording and playing position. Usually the transport also includes cassette-engaging positioning and holding surfaces and transducing and metering means engaging the tape through openings in the cassette. If, however, there is any misalignment between the spindles, the cassette-engaging surfaces, or the transducing and metering means of the transport, then it often happens that the tape packs are caused to rub on the walls of the cassette. This is because the tape packs are precisely aligned only with the spindles, while the walls of the cassette may be forced by the other misaligned elements to assume an undesired angle with respect to the spindles and tape packs.

In audio use, this rubbing effect causes undesirable variations in tape tension with resulting flutter distortion of the reproduced sound. Now it is proposed to use such cassettes for digital and instrumentation recording, wherein the flutter distortions would also be objectionable, but wherein another deleterious effect assumes major proportions. When the tape pack rub on the sides of the cassette, the tape edges are abraded and a great deal of the granular magnetic oxide surface layer of the tape is ground off to form a thick in within the cassette. Specks of this dust settling on the other portions of the tape cause "dropouts" or loss of information, which is much more serious in digital recording than in audio uses.

It is therefore an object of the present invention to provide a tape cassette in which the tape packs are arranged to avoid rubbing on the cassette walls.

It is another object of the invention to provide a cassette as above-described which at the same time accommodates itself to misalignment between the reel spindles, the cassette-holding surfaces and the transducing and metering means of a transport to which the cassette is applied.

SUMMARY OF THE INVENTION

The above and other objects are achieved in a tape cassette structure that is provided with a precision base plate for engaging the cassette-holding surfaces of a transport, a pair of precision ball bearing assemblies mounted solidly on the baseplate, and a pair of tape pack hubs mounted on the bearings and adapted to loosely engage the driving spindles of the transport, so that misalignment of the transport spindles can be tolerated while maintaining the tape packs precisely spaced from the walls of the cassette to avoid rubbing flutter and the abrasion production of oxide dust. The tape is guided with substantial lateral tolerance near the transducing and metering elements of the transport, but is precisely edge-guided near the tape packs. The guides are placed to increase the run of tape available for access.

DESCRIPTION OF THE PREFERRED EMBODIMENTS

Figure 1:
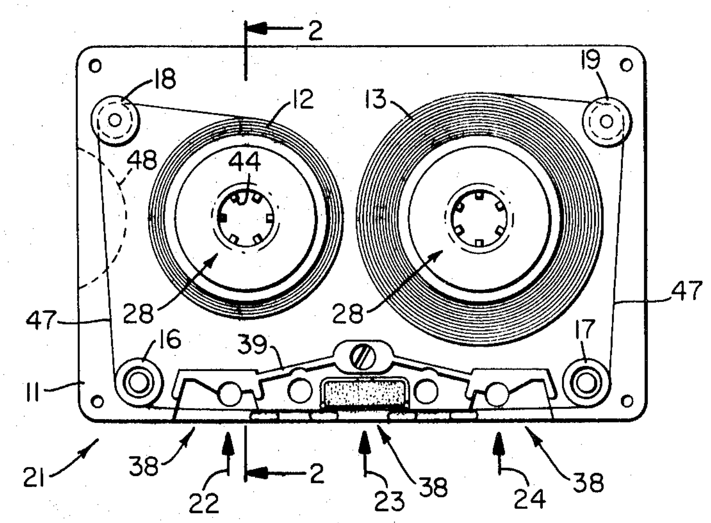
FIG. 1 is a plan view of a tape cassette in accordance with the invention with the side and cover plate portion removed.

Referring now to the drawings, and particularly to FIG. 1 thereof, there is shown a tape cassette including a precision baseplate 11, made preferably of aluminum or some other metal or hard and rigid substance. A pair of magnetic tape packs 12 and 13 are mounted for rotation on the plate 11 and the tape is guided between the packs by a pair of first guides 16, 17 and a pair of second guides 18, 19 so as to follow a predetermined path along one side 21 of the cassette for engagement with transport-mounted transducing and metering means represented by the arrows 22, 23, 24.

Figure 2:
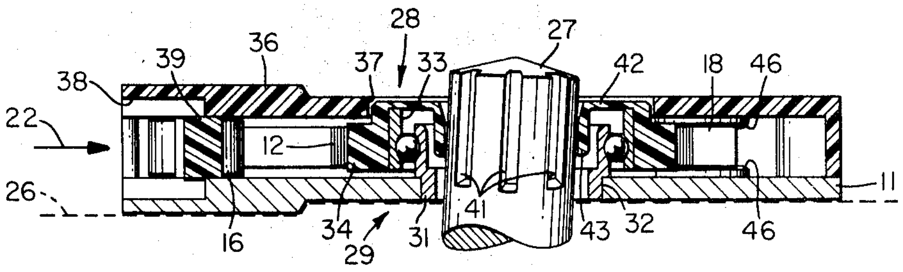
FIG. 2 is an enlarged cross section taken along the plane of lines 2—2 of FIG. 1 and showing the cassette of FIG. 1 with the side and cover plate portion thereof in place and a spindle inserted.

As shown in FIG. 2, a surface 26 may be provided on a transport for engaging the cassette and for defining part of a cassette-holding and positioning means; and a pair of drive spindles 27 may extend from the surface 26 for driving the tape packs 11, 12.

However, as is illustrated in the FIG., it often happens that the spindles 27 of a transport are not accurately aligned so as to be strictly normal to the plane of the positioning surface 26, and in such case the prior art has generally provided a tape pack hub that is precision-splined to the spindle 27 but is only loosely mounted within the cassette, so that the cassette can accommodate itself to the surface 26 and the entire error in alignment is caused to appear as a misalignment of the tape pack and the walls of the cassette itself. Unfortunately, however, this misalignment often causes abrasive rubbing of the tape pack against the cassette walls, with the undesirable results described above under the heading "Background of the Invention."

Instead, in the present invention, the error in spindle alignment is caused to appear between the spindle 27 and the tape pack, as by means of a precision bearing assembly 28, one example of which is illustrated and described as follows.

The precision bearing assembly 28 includes a precision ball bearing element 29 having an inner race 31 solidly mounted in a conforming opening 32 in the plate 11, and an outer race 33 on which is affixed a tape hub 34, which may be made of plastic, for example, in contrast to the conventionally metallic ball bearing element 29. With the tape pack 12 uniformly wound on hub 34, it will be seen that the pack is always aligned in a plane parallel to and substantially spaced from the plate 11, so that it cannot rub thereon. Likewise, a side and cover plate element 36, which may be made of plastic, is mounted on the plate 11 so as to be perpetually parallel to and substantially spaced from the plane of the tape pack. The element 36 may be provided with openings 37 to loosely accommodate a stepped portion of the hub 34, and openings 38 to accommodate the transport transducing and metering means 22, 23, 24; and a conventional partition member 39 may be provided between the plate 11 and cover 36 to protect the tape packs from contamination entering through the openings 38.

With the tape packs rendered perpetually parallel to the cassette walls as described above, and the walls in turn being aligned parallel to the surface 26, the error in alignment of the spindle 27 is caused to appear between the spindle and hub 34 as by means of a radially loosely fitting but circumferentially precisely splined connection described as follows. The spindle 27 is provided with spline grooves 41, and the hub 34 is provided with a web portion 42 extending radially and inwardly past the inner race 31 of the bearing element 29 on the side remote from the plate 11 and terminating in a reentrant portion 43 that defines the loose spindle-engaging portion of the hub. Specifically, the portion 43 is dimensioned to have an interior diameter substantially greater than the exterior diameter of the spindle 27, and is provided with a number of inwardly extending teeth 44 dimensioned to precisely fit circumferentially within the spline grooves 41 of the spindle. Thus, the hub is arranged to tolerate an inclined alignment of the spindle 27, as illustrated, without introducing any further looseness in the relative circumferential fit of the hub and spindle.

There remains one problem in the alignment of the tape and the transducing and metering elements of the transport, which also may be out of alignment with or proper spaced position from the surface 26. To accommodate these tolerances, the plate 11 and cover 36 of the cassette are spaced sufficiently far apart to permit a substantial lateral tape displacement (i.e., in the plane of the tape) along the side 21 where the tape must meet these transport elements. To accommodate this possible lateral displacement, the guides 16, 17 are provided as flangeless rollers having an axial dimension nearly as great as the space between the plate 11 and cover 36. However, in order to make certain that the tape is guided into the tape packs at the midzone between the plate 11 and cover 36, the guides 18, 19 are provided with flanges 46 spaced a tape-width apart, for precisely edge-guiding the tape. To allow the greatest possible latitude for tape displacement, the guides 16, 17 are placed in the adjacent corners along the operative side 21 of the cassette, while the flanged guides 18, 19 are placed in the remote corners but near the tape packs 12, 13. It will be noted that this arrangement leaves two side runs 47 of tape for additional access to the tape, as by means of openings or breakouts in the cassette such as that illustrated schematically by the dashed line 48.

Figure 3:
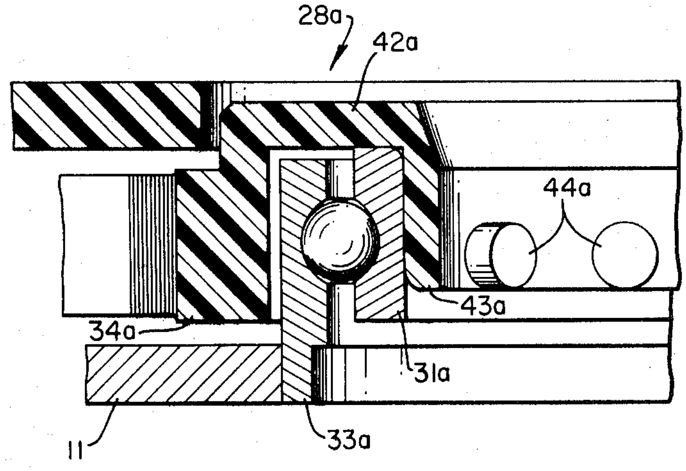
FIG. 3 is a further enlarged and fragmented cross section showing a variational arrangement of a portion of the structure shown in FIG. 2.

In FIG. 3, an alternative arrangement of the tape pack hub and bearing is illustrated. Instead of the inner race of the bearing being affixed to the plate 11, the outer race 33*a* is so affixed, and the hub 34*a* is affixed to the inner race 31*a* by the reentrant portion 43*a* that bears the teeth 44*a*. The tape-mounting portion 34*a* is then connected to the portion 43*a* by means of a web 42*a* that extends radially inward from the portion 34*a* on the side opposite the plate 11.

Thus there has been described a tape cassette provided with a precision baseplate for engaging the cassette-holding surfaces of a transport, a pair of precision ball bearing assemblies mounted solidly on the baseplate, and a pair of tape pack hubs mounted on the bearings and adapted to loosely engage the driving spindles of the transport, so that misalignment of the transport spindles can be tolerated while maintaining the tape packs precisely spaced from the walls of the cassette to avoid rubbing flutters and abrasion production of oxide dust. The tape is guided with substantial lateral tolerance near the transducing and metering elements of the transport, but is precisely edge-guided near the tape packs. The guides are placed to increase the run of tape available for access.

I claim

1. A tape cassette, for application to a transport having transducing and metering means, a cassette-holding assembly and a pair of driving spindles, comprising:
   - a base member; and
   - a pair of combination journal and thrust bearing assemblies solidly mounted on said base member and having portions dimensioned to loosely engage said driving spindles;
   - said bearing assemblies including a pair of tape hubs for winding up said tape in packs; and
   - said bearing assemblies having closely interfitting rotor and stator portions so that said hubs and tape packs are continuously and entirely held in a predetermined spaced relation to said base member.

2. A cassette as recited in claim 1, wherein there are also provided:
   - first means mounted on said base member for guiding said tape between said packs along a predetermined path in said cassette for engagement with said transducing and metering means of said transport; and
   - second tape-guiding means including a pair of flanged idlers mounted on said base member adjacent said hubs and remote from said first guiding means for edge-guiding said tape to and from said tape packs in said predetermined spaced relation to said base member.
3. A cassette as recited in claim 2, wherein:
   - said base member is a plate adapted to engage said holding assembly of said transport;
   - said bearing assemblies each including a precision ball bearing element having an inner race and an outer race, one of said races being affixed to said plate; and
   - said hubs each being formed as a member solidly mounted on the other of said races and including a spindle-engaging portion constituting said portion of said bearing assembly dimensioned for loosely engaging said respective spindle.
4. A cassette as recited in claim 3, wherein:
   - the inner race of each ball bearing element is affixed to said plate; and
   - each of said hubs is affixed to the corresponding outer race of said ball bearing element and has a web portion extending radially and inwardly past said inner race on the side thereof remote from said plate to define said loose spindle-engaging portion.
5. A cassette as recited in claim 3, wherein:
   - the outer race of each ball bearing element is affixed to said plate; and
   - each of said hubs has a web portion extending radially and inwardly past said inner race on the side thereof remote from said plate and affixed to said inner race to define said loose spindle-engaging portion.
6. A cassette as recited in claim 3 wherein said cassette is generally rectangular in shape, and wherein:
   - said first guiding means include a pair of flangeless idlers mounted in two adjacent corners of said cassette; and
   - said second guiding means include a pair of flanged idlers mounted in the other two adjacent corners of said cassette.
7. A cassette as recited in claim 6, wherein:
   - said cassette also includes a side and cover plate element mounted on said baseplate and defining sides and a cover wall for said cassette in a precisely predetermined spaced relation to said plate and to said tape packs.
8. A cassette as recited in claim 7, wherein:
   - said cassette is provided with at least one opening along at least one of the runs of tape between said first and second guide means for access to said tape.

* * * * *